(12) United States Patent  (10) Patent No.: US 8,768,796 B2
Bang et al.  (45) Date of Patent: Jul. 1, 2014

(54) SYSTEM FOR ANALYZING REVENUE CYCLES OF A FACILITY

(71) Applicant: Crowe Horwath LLP, South Bend, IN (US)

(72) Inventors: Derek Andrew Bang, Fishers, IN (US); Calab Donald Decker, Westfield, IN (US)

(73) Assignee: Crowe Horwath LLP, Oak Brook, IL (US)

( * ) Notice: Subject to any disclaimer, the term of this patent is extended or adjusted under 35 U.S.C. 154(b) by 0 days.

(21) Appl. No.: 13/661,001

(22) Filed: Oct. 25, 2012

(65) Prior Publication Data

US 2013/0046662 A1 Feb. 21, 2013

Related U.S. Application Data

(62) Division of application No. 11/557,273, filed on Nov. 7, 2006, now Pat. No. 8,301,519.

(60) Provisional application No. 60/807,165, filed on Jul. 12, 2006.

(51) Int. Cl.
*G06Q 40/00* (2012.01)
*G07B 17/00* (2006.01)

(52) U.S. Cl.
USPC .................................. 705/30; 705/4; 705/40

(58) Field of Classification Search
USPC .................................................. 705/30, 40, 4
See application file for complete search history.

(56) References Cited

U.S. PATENT DOCUMENTS

| | | | |
|---|---|---|---|
| 5,933,817 A | 8/1999 | Hucal | |
| 6,041,312 A * | 3/2000 | Bickerton et al. | 705/36 R |
| 6,073,104 A | 6/2000 | Field | |
| 7,346,523 B1 * | 3/2008 | Provost et al. | 705/4 |
| 7,962,403 B2 | 6/2011 | Banasiak et al. | |
| 8,301,519 B2 | 10/2012 | Bang et al. | |
| 2001/0032177 A1 | 10/2001 | Starkman | |
| 2002/0091549 A1 * | 7/2002 | Provost et al. | 705/4 |
| 2002/0133368 A1 * | 9/2002 | Strutt et al. | 705/1 |
| 2002/0165757 A1 * | 11/2002 | Lisser | 705/10 |
| 2003/0050802 A1 * | 3/2003 | Jay et al. | 705/3 |
| 2003/0236697 A1 * | 12/2003 | Rupp | 705/10 |
| 2004/0193477 A1 * | 9/2004 | Barzuza | 705/10 |
| 2004/0193542 A1 * | 9/2004 | Brown et al. | 705/40 |

(Continued)

FOREIGN PATENT DOCUMENTS

WO WO 99/33010 7/1999

OTHER PUBLICATIONS

Clarke R. constant coverage of charging and collection concerns. Hfm (Healthcare Financial Management) [serial online]. Dec. 2003;57(12):112. Available from: Business Source Complete, Ipswich, MA.*

(Continued)

*Primary Examiner* — Matthew Gart
*Assistant Examiner* — Ashford S Hayles
(74) *Attorney, Agent, or Firm* — Brinks Gilson & Lione

(57) ABSTRACT

The present disclosure provides methods and apparatus for analyzing the revenue cycles of a facility to more accurately predict future financial performance. Using the methods and apparatus disclosed herein, accountants and financial planners are given forecasts of future accounts paid based on current accounts receivable and past accounts paid.

20 Claims, 12 Drawing Sheets

(56) References Cited

U.S. PATENT DOCUMENTS

| | | | |
|---|---|---|---|
| 2005/0102204 A1* | 5/2005 | Kataoka | 705/30 |
| 2005/0102228 A1 | 5/2005 | Srinivasan et al. | |
| 2005/0262014 A1* | 11/2005 | Fickes | 705/38 |
| 2006/0080139 A1* | 4/2006 | Mainzer | 705/2 |
| 2006/0085302 A1* | 4/2006 | Weiss et al. | 705/30 |
| 2006/0167772 A1* | 7/2006 | Zilberman | 705/35 |
| 2006/0186193 A1* | 8/2006 | Nelson et al. | 235/379 |
| 2006/0247987 A1* | 11/2006 | Busch et al. | 705/30 |
| 2007/0067236 A1* | 3/2007 | Deinhardt et al. | 705/39 |
| 2007/0203834 A1* | 8/2007 | Field | 705/40 |
| 2007/0214077 A1* | 9/2007 | Barnes et al. | 705/38 |
| 2008/0196108 A1* | 8/2008 | Dent et al. | 726/28 |
| 2010/0161459 A1* | 6/2010 | Kass et al. | 705/30 |
| 2010/0198709 A1* | 8/2010 | Ballow et al. | 705/30 |
| 2011/0208625 A1* | 8/2011 | Ballow et al. | 705/30 |

OTHER PUBLICATIONS

Laforge R, Tureaud J. Revenue-Cycle Redesign: Honing the Details. Hfm (Healthcare Financial Management) [serial online]. Jan. 2003;57(1):64. Available from: Business Source Complete, Ipswich, MA.*

Becker C. Balance past due. Modern Healthcare [serial online]. Sep. 22, 2003;33(38):32. Available from: Academic Search Premier, Ipswich, MA.*

Bankston, Karen, "Upping the Score," Credit Union Management, vol. 20, No. 7, pp. 30-31, Jul. 1997.

Ladwig, Kit, "Who's on Top," Collections & Credit Risk, vol. 6, No. 12, pp. 32-37, Dec. 2001.

* cited by examiner

SYSTEM FOR ANALYZING REVENUE CYCLES OF A FACILITY

CROSS REFERENCE TO RELATED APPLICATIONS

This application claims priority to U.S. patent application Ser. No. 11/557,273, filed Nov. 7, 2006, and U.S. Provisional Patent Application Ser. No. 60/807,165 filed on Jul. 12, 2006, both of which are hereby incorporated by reference in their entirety.

TECHNICAL FIELD

The present application relates in general to accounting systems and more specifically to methods and apparatus for analyzing revenue cycles of a facility.

BACKGROUND

The finances of facilities have become more complex in recent years. Accountants have difficulty tracking the financial status of facilities due to a number of factors. For instance, computer networks allow accountants greater access to data more immediately than in the past. As a result, accountants and those planning the finances of facilities sometimes find themselves faced with an overwhelming amount of data and unable to categorize it. Subsequently, it is often difficult to make meaningful conclusions based on the available data.

Some accountants and financial planners have turned to general accounting systems to resolve some of these issues. However, general accounting systems often only aggregate data and do not provide certain analysis. Having data collected in one view is helpful, but it can still be difficult to determine what the data represents. Additionally, general accounting systems provide a snapshot of the current financial state of a facility but lack certain tools useful in forecasting and identifying financial opportunities or weaknesses.

Some accountants and financial planners use accounting systems that provide them with regular reports as to financial performance. However, the accounting systems typically fail to accurately predict future financial performance. Also, the reports are often not timely and it is difficult to make immediate decisions that would improve financial performance.

SUMMARY

The present disclosure provides methods and apparatus for analyzing the revenue cycles of a facility to more accurately predict future financial performance. Using the methods and apparatus disclosed herein, accountants and financial planners are given forecasts of future accounts paid based on current accounts receivable and past accounts paid.

Additional features are described herein, and will be apparent from the following detailed description of the figures.

DETAILED DESCRIPTION

Figure 1:
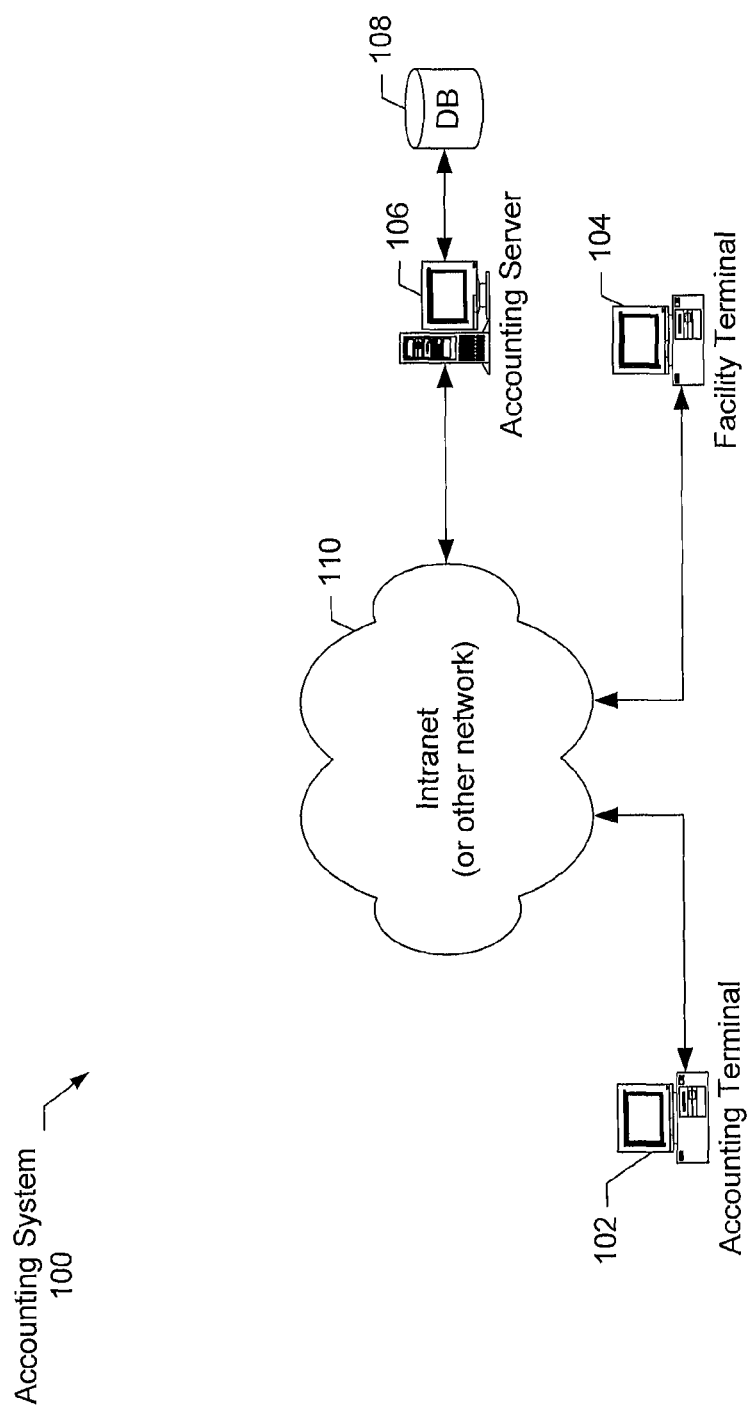
FIG. 1 is a high level block diagram of a communications system.

The present system is most readily realized in a network communications system. A high level block diagram of an exemplary network communications system 100 is illustrated in FIG. 1. The illustrated system 100 includes one or more accounting terminals 102, one or more facility terminals 104, one or more accounting servers 106, and one or more databases 108. Each of these devices may communicate with each other via a connection to one or more communications channels 110 such as the Internet or some other data network, including, but not limited to, any suitable wide area network or local area network. It will be appreciated that any of the devices described herein may be directly connected to each other instead of over a network.

The accounting server 106 stores a plurality of files, programs, and/or web pages in one or more databases 108 for use by accounting terminals 102 and/or the facility terminals 104. The database 108 may be connected directly to the accounting server 106 and/or via one or more network connections. The database 108 stores financial information, including, but not limited to, accounts receivable information, accounts paid information, realization rates, etc. For example, database 108 may store account information regarding a client of a facility. The facility may includes any number of branches, franchises, sales offices, etc. For example, the facilities may include hospitals, treatment centers and service centers.

One accounting server 106 may interact with a large number of terminals. Accordingly, each server 106 is typically a high end computer with a large storage capacity, one or more fast microprocessors, and one or more high speed network connections. Conversely, relative to a typical server 106, each accounting terminal 102 or facility terminal 104 typically includes less storage capacity, a single microprocessor, and a single network connection.

Figure 2:
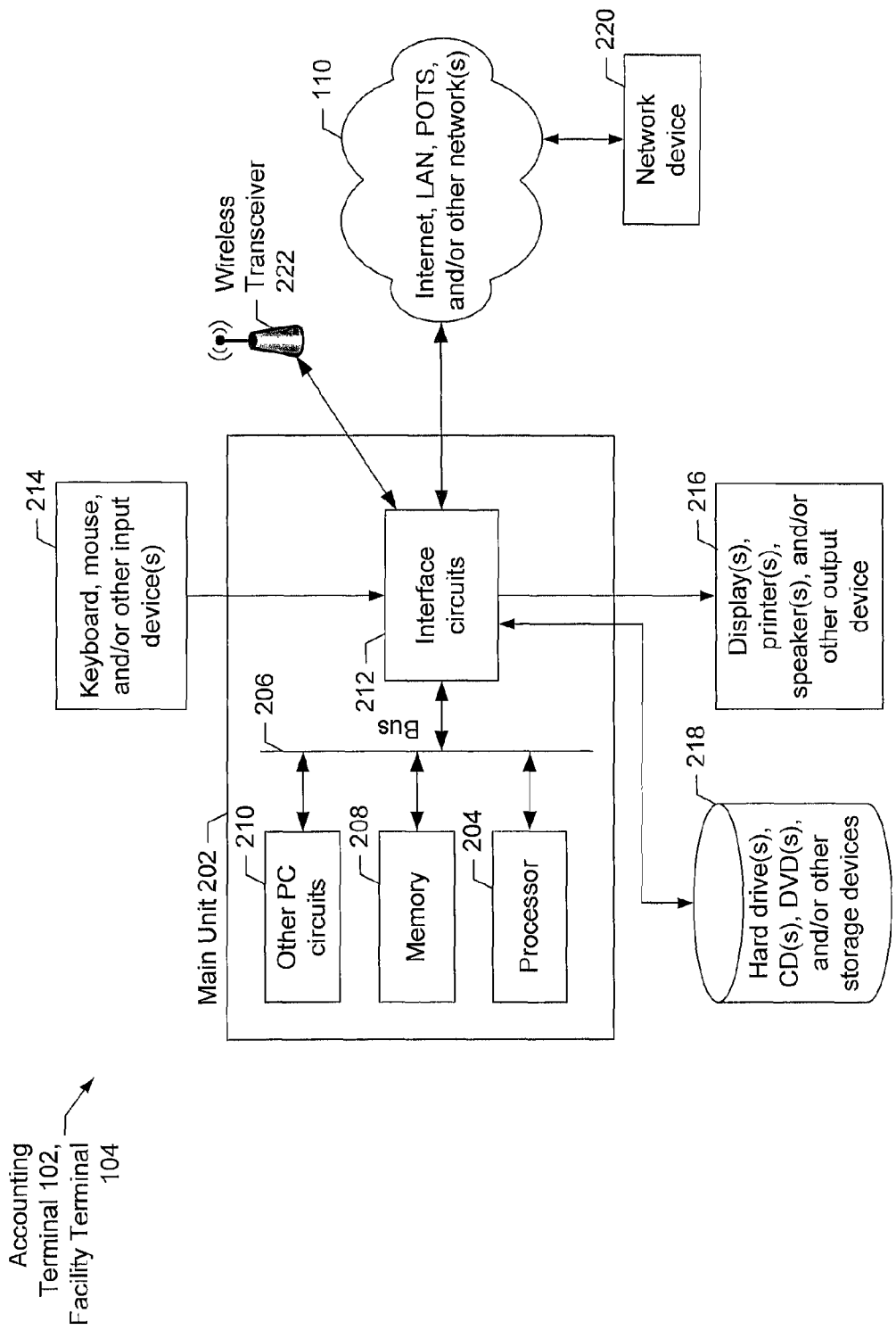
FIG. 2 is a more detailed block diagram showing one example of a client device.

A more detailed block diagram of an accounting terminal 102 or facility terminal 104 is illustrated in FIG. 2. The accounting terminal 102 or facility terminal 104 may include a personal computer (PC), a personal digital assistant (PDA), an Internet appliance, a cellular telephone, or any other suitable communication device. The accounting terminal 102 or facility terminal 104 preferably includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from an accounting server 106 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the accounting terminal 102 or facility terminal 104. For example, the display 216 may be used to display web pages received from the accounting server 106. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the accounting terminal 102 or facility terminal 104.

The accounting terminal 102 or facility terminal 104 may also exchange data with other network devices 220 via a connection to the network 110. The network connection may be any type of network connection, such as an Ethernet connection, digital subscriber line (DSL), telephone line, coaxial cable, etc. Users of the system 100 may be required to register with the accounting server 106. In such an instance, each user may choose a user identifier (e.g., e-mail address) and a password which may be required for the activation of services. The user identifier and password may be passed across the network 110 using encryption built into the user's browser. Alternatively, the user identifier and/or password may be assigned by the accounting server 106.

Figure 3:
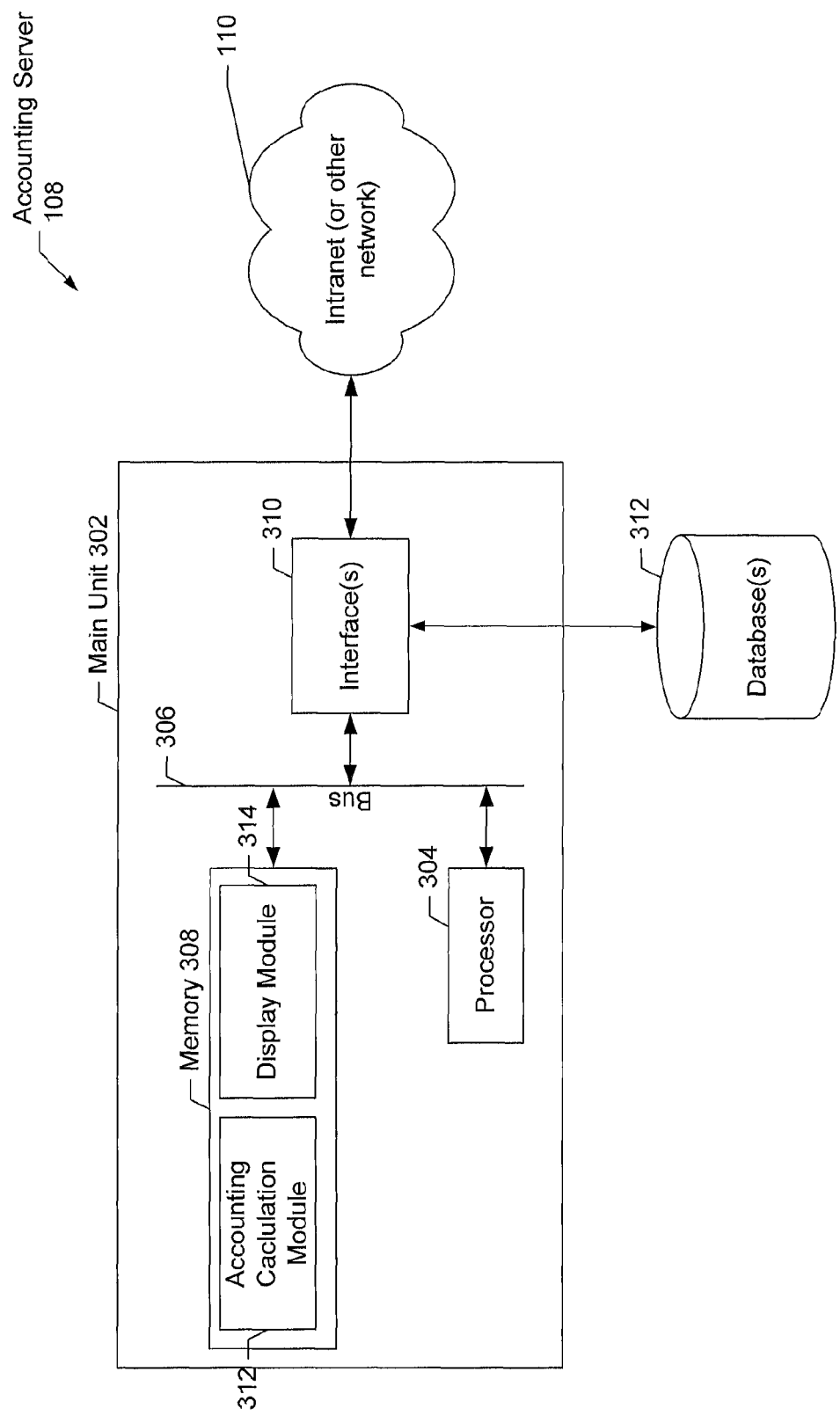
FIG. 3 is a more detailed block diagram showing one example of a server.

A more detailed block diagram of a accounting server 106 is illustrated in FIG. 3. Like the accounting terminal 102 and facility terminal 104, the main unit 302 in the accounting server 106 preferably includes a one or more processors 304 electrically coupled by an address/data bus 306 to a memory device 308 and a network interface circuit 310. The network interface circuit 310 may be implemented using any suitable data transceiver, such as an Ethernet transceiver. The processor 304 may be any type of suitable processor, and the memory device 308 preferably includes volatile memory and non-volatile memory. Preferably, the memory device 308 stores a software program that implements all or part of the method described below.

In particular, the memory preferably stores an accounting calculation module 312 and a display module 314. The accounting calculation module 312 performs the necessary calculations to the financial data as described below. The display module is configured to aid in displaying the financial data to the account terminal 102 and facility terminal 104. These software modules may be executed by the processor 304 in a conventional manner. However, some of the steps described in the method below may be performed manually or without the use of the accounting servers 106. The memory device 308 and/or a separate database 312 also store files, programs, web pages, etc. for use by other accounting servers 106, accounting terminals 102 or facility terminals 104.

Figure 4:
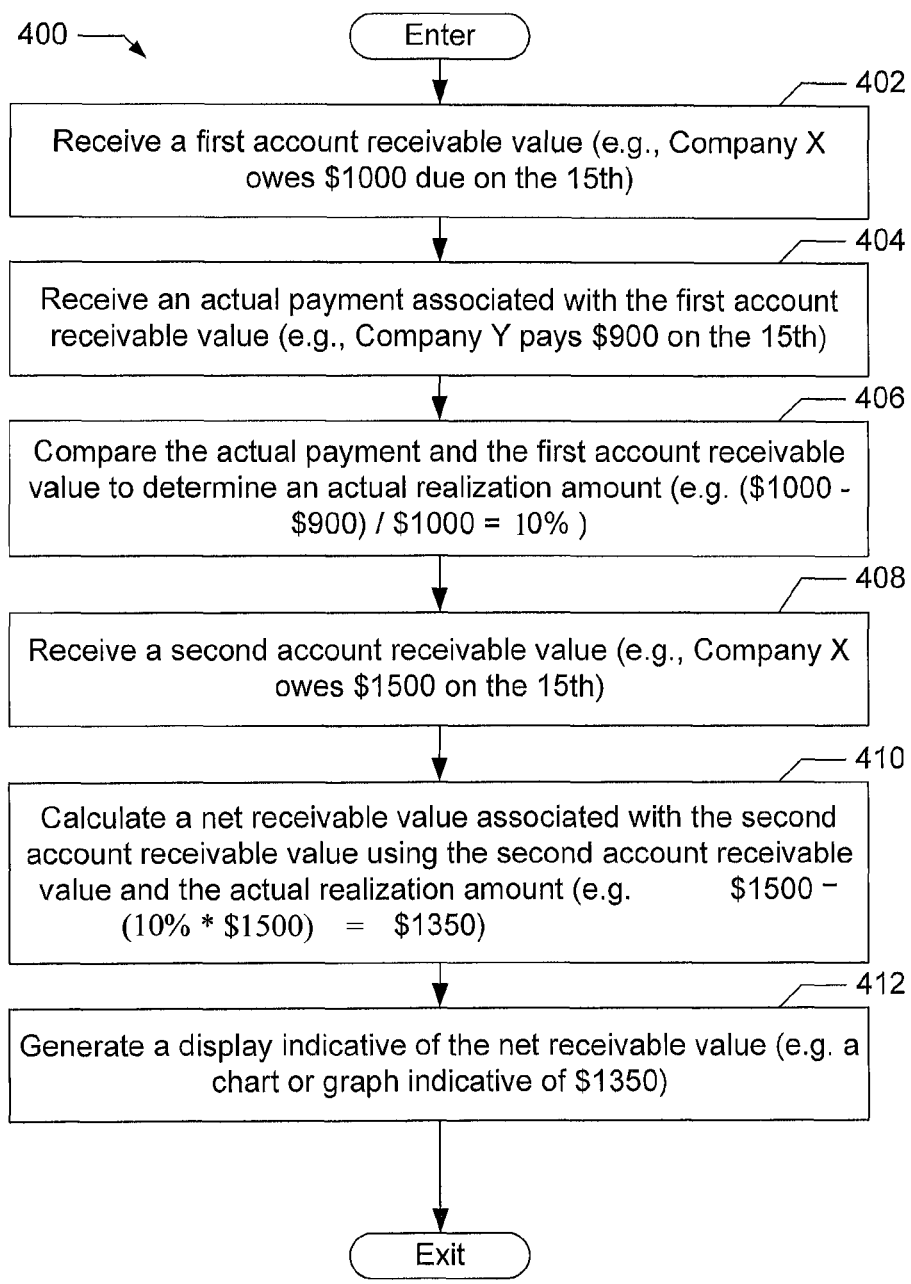
FIG. 4 is a flowchart of an example process to calculate a net receivable.

A flowchart of an example process 400 for analyzing revenue cycles is presented in FIG. 4. Preferably, the process 400 is embodied in one or more software programs which is stored in one or more memories and executed by one or more processors. Although the process 400 is described with reference to the flowchart illustrated in FIG. 4, it will be appreciated that many other methods of performing the acts associated with process 400 may be used. For example, the order of many of the steps may be changed, and some of the steps described may be optional.

In this example, the process 400 receives a first account receivable value (block 402). For example, a user can transmit an account receivable value from a facility terminal 104 to the accounting server 106. In an embodiment, the data is manually entered on an accounting terminal 102 and transmitted via an intranet connection 110 to an accounting server 106. In one embodiment, the account receivable value represents the amount due from an organization, an individual or a government. An organization may include non-profit organization and/or for-profits organizations.

Subsequently, the example process 400 receives an actual payment associated with the first account receivable value (block 404). For example, a user could receive a payment and then enter a value of the payment on a facility terminal 104. This value may then be transmitted to the accounting server 106. In one embodiment, the payment information is in the form of a check, cash or a money order. In an embodiment, the payment information is in the form of an electronic receipt that is transmitted directly to the accounting server 106 from another facility, such as a bank. In an embodiment, an accountant manually enters payment information on the accounting terminal 102 and transmits the data to the accounting server 106.

The example process 400 then compares the actual payment and the first account receivable value to determine an actual realization amount (block 406). For example, the actual payment could be subtracted from the first account receivable value and the result could be divided by the original account receivable value, providing a percentage of remaining account receivable. In an embodiment, a plurality of actual realization amounts are calculated based on the type of account receivable values present in the system, such as the realization amount relating to recovery of bad debt cases.

The example process 400 then receives a second account receivable value (block 408). For example, an accountant may enter an account receivable value into an accounting terminal 102 for transmission to the accounting server 106. In an embodiment, the accounting terminal 102 automatically generates an account receivable value, based on stored data, and transmits the account receivable value to the accounting server 106. In another embodiment, the account receivable value is generated based on accounting rules, such as a Medicaid accounting rule.

The example process 400 then calculates a net receivable value associated with the second account receivable value using the second account receivable value and the actual realization amount (block 410). For example, the actual realization amount may be multiplied with the second account receivable value. In an embodiment, the actual realization amount is multiplied with the second account receivable value as well as modified by another value, such as an interest amount. In one embodiment, a plurality of net receivable values are calculated based on the type of account, such as individuals, corporations, organizations, etc. Other types of accounts include bad debt accounts, frequently late payment accounts, credit accounts, etc.

The example process 400 then generates a display indicative of the net receivable value (block 412). For example, a chart may be provided showing the net receivable value and/or other statistics. In an embodiment, a graph is presented showing the net receivable value or other statistics. In an embodiment, a plurality of net receivable values are presented, such as the net receivable values for a number of franchises or facilities. In an embodiment, a plurality of net receivable values are presented, indicating net receivable values based on the type of account.

Figure 5:
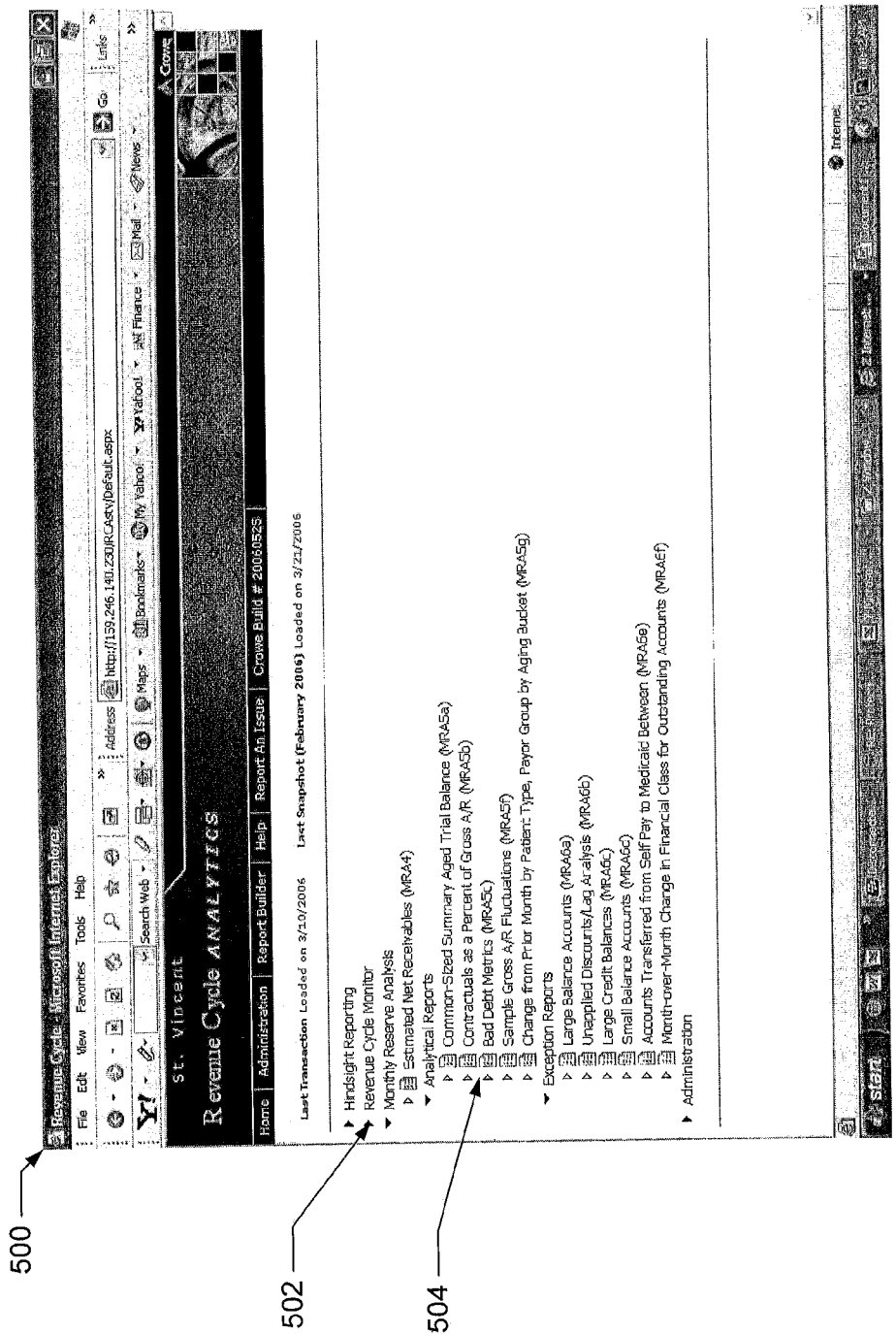
FIG. 5 is a diagram illustrating an example screen for displaying net receivable values.

Preferably, one or more of the steps in process 400 are presented to users via a menu system. A screenshot of an example menu 500 is presented in FIG. 5. Although the menu 500 is described with reference FIG. 5, it will be appreciated that many other configurations are possible. For example, elements could be in different locations, elements could have different names, and elements could have different graphical representations.

The example menu 500 contains a high level statistic category 502. The high level statistic category, for example, can pertain to different categories of statistical analysis available to the user. The user can select a category, for example, using a mouse by clicking on the category, or using a touch screen by touching the appropriate category. The detailed statistical category 504 is contained, for example as a subset of the high level statistical category. In the current example, the detailed category appears as a sub category of a high level statistical category.

Figure 6:
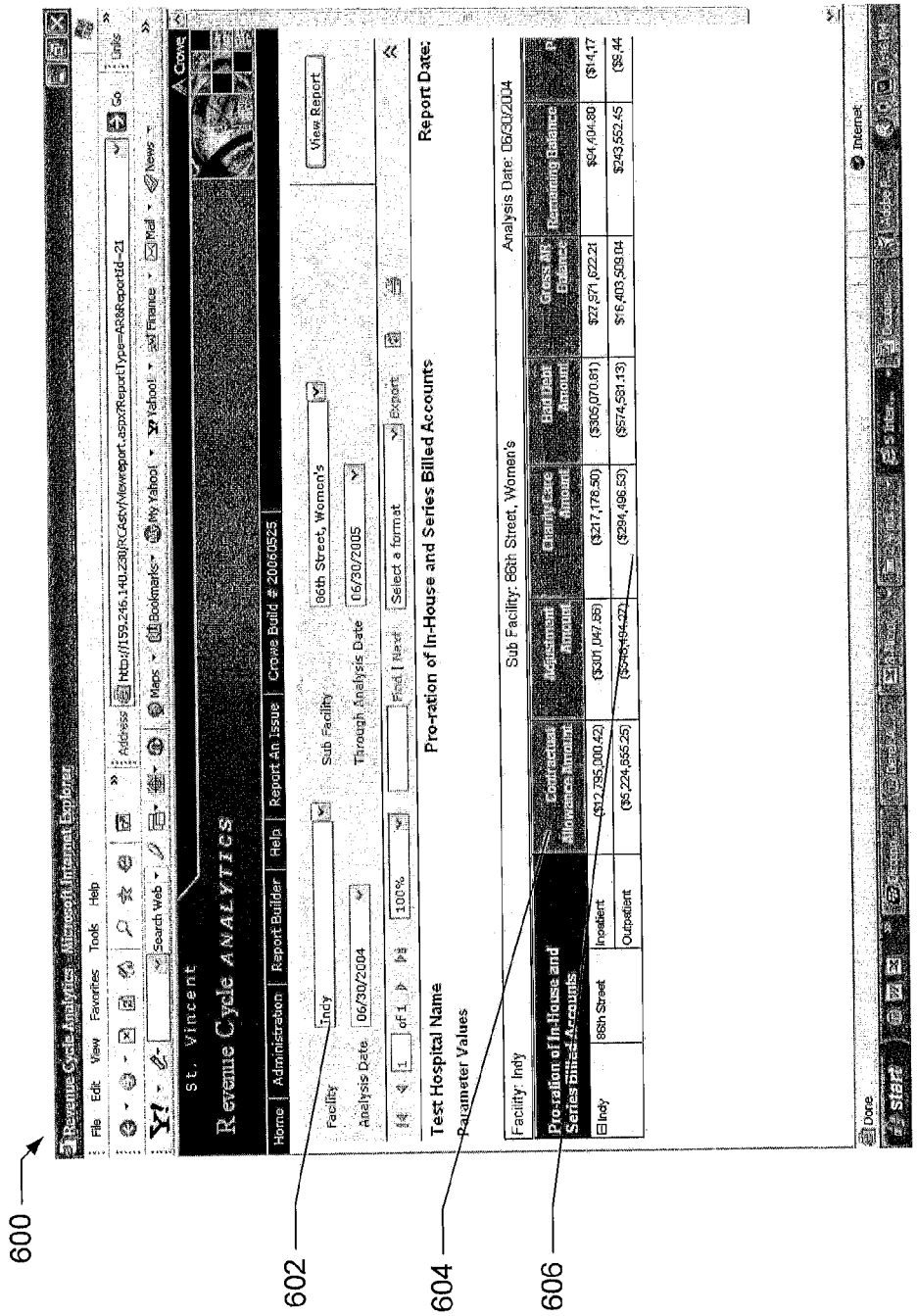
FIG. 6 is a diagram illustrating an example screen displaying user choices for displaying net receivable values.

A screenshot of an example category metrics view 600 is presented in FIG. 6. Although the category metrics 600 is described with reference FIG. 6, it will be appreciated that many other configurations are possible. For example, elements could be in different locations, elements could have different names, and elements could have different graphical representations. The category metrics 600, can contain a view by facility 602. For example, if there are multiple facilities, the user can select which facility to view with a drop down box 602. Additionally, the category metrics view 600 can contain header information for specific statistic data 604. The category metrics view 600 can also contain the actual expected value or actual received value 606. The actual expected or received value can be shown, for example as a dollar amount or graphically represented.

Figure 7:
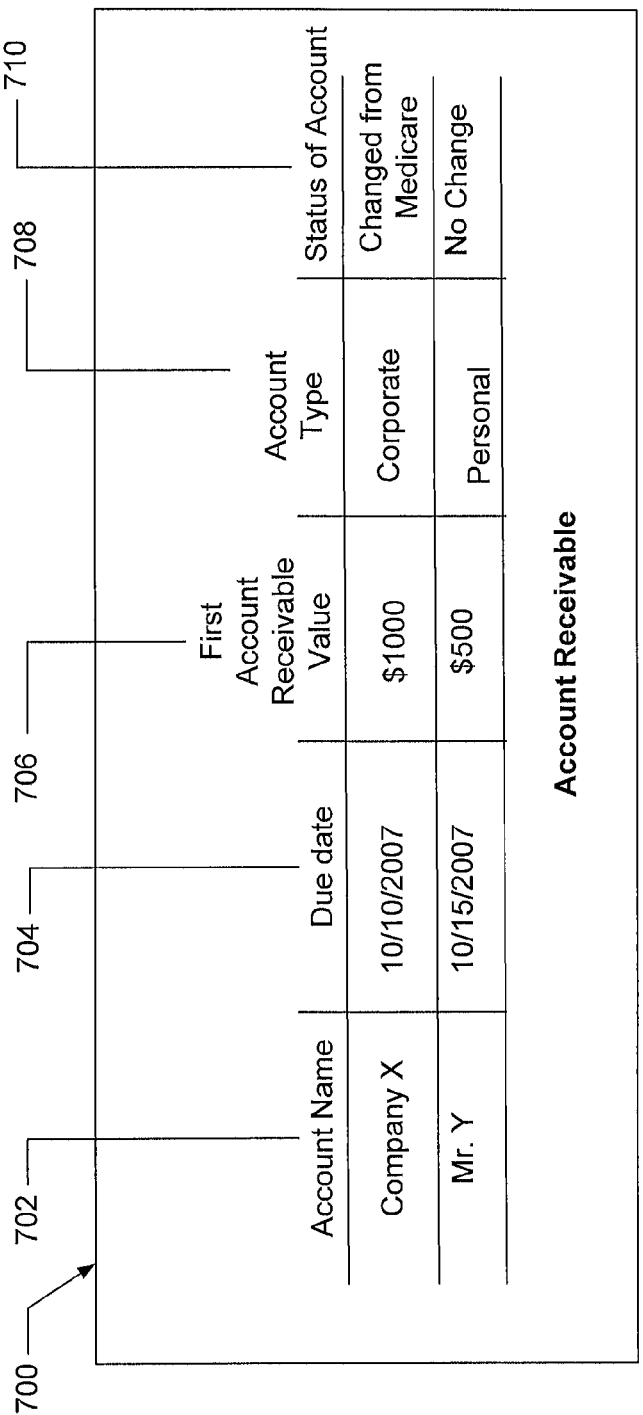
FIG. 7 is a diagram illustrating an example screen displaying an account receivable entry.

A screenshot of an example account receivable entry 700 is presented in FIG. 7. Although the accounts receivable entry 700 is described in reference FIG. 7, it will be appreciated that many other configurations are possible. For example, elements could be in different locations, elements could have different names, and elements could have different graphical representations. In one embodiment, the account name 702 is displayed with an associated due date 704, first account receivable value 706, account type 708, and status of account 710. In one embodiment, the account type 708 is used in process steps 406 and 410 to calculate account type specific data. In one embodiment, the account type 708 is used in process step 412 to display the net receivable value by account type, such as displaying by individual customer accounts or by government accounts.

Figure 8:
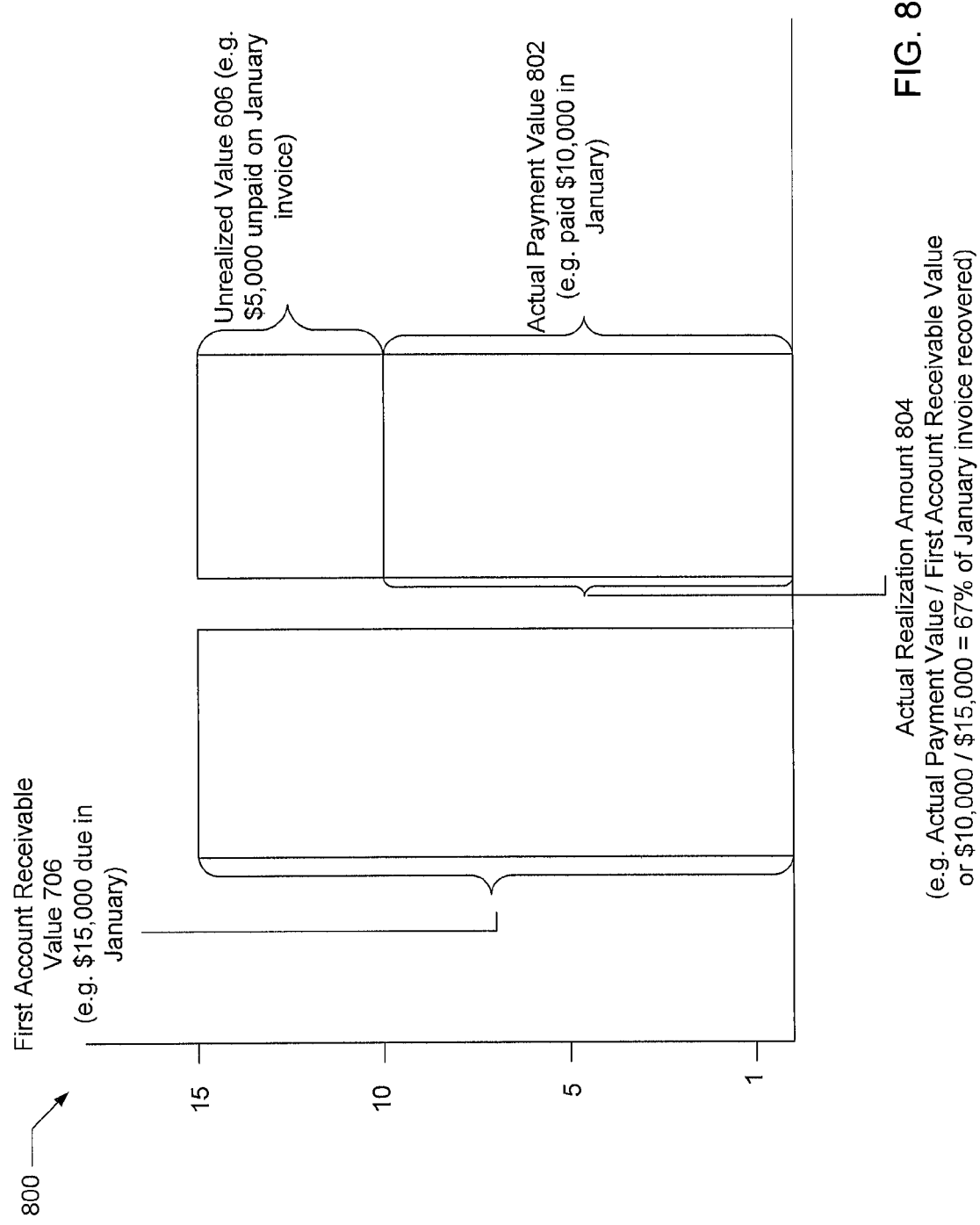
FIG. 8 is a diagram illustrating an actual realization amount.

A diagram of the relation between the first account receivable value 706, unrealized value 606, actual payment value 802 and actual realization amount 804 is presented in FIG. 8. In one embodiment, first account receivable value 706 has an associated actual payment value 802. In an embodiment, the unrealized value 606 is the difference between the first account receivable value 706 and the actual payment value 802. For example, if the first account receivable value 706 is $15,000 due in January and the actual payment value 802 is $10,000 in January, then the unrealized value 606 is $5,000 on the January invoice. In one embodiment, the actual realization amount 804 is the actual payment value 802 divided by the first account receivable value 706. For example, using the above values, $10,000/$15,000 or 67%.

Figure 9:
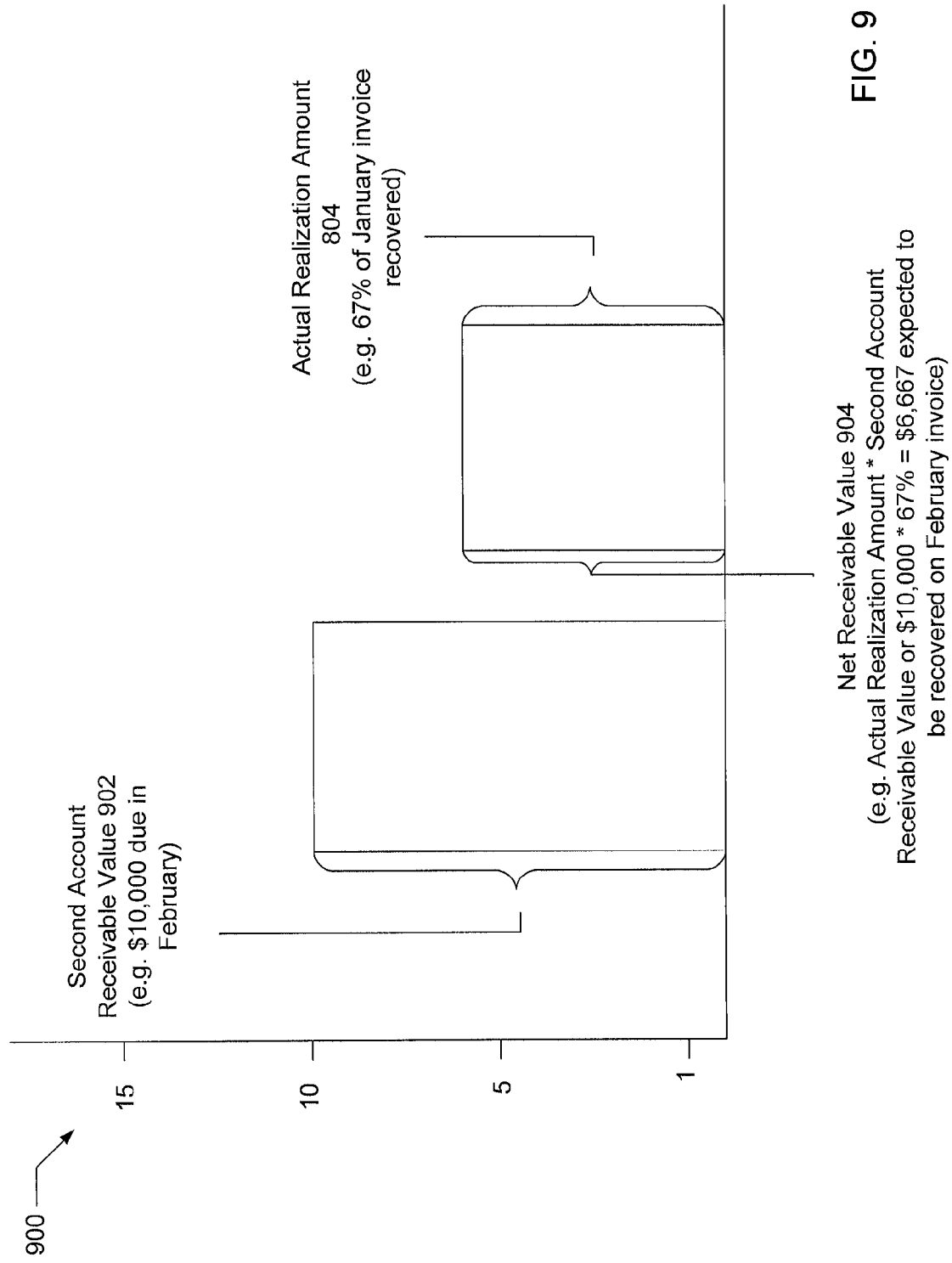
FIG. 9 is a diagram illustrating a net receivable value.

A diagram of the relation between a second account receivable value 902, an actual realization amount 804 and net receivable value 904 is presented in FIG. 9. In one embodiment, the actual realization amount 804 is multiplied with the second account receivable value 902 to determine the net receivable value 904. For example, if the second account receivable value is $10,000 due in February and the actual realization amount 804 is 67% then the net receivable value 904 is $10,000*67% or $6,667.

Figure 10:
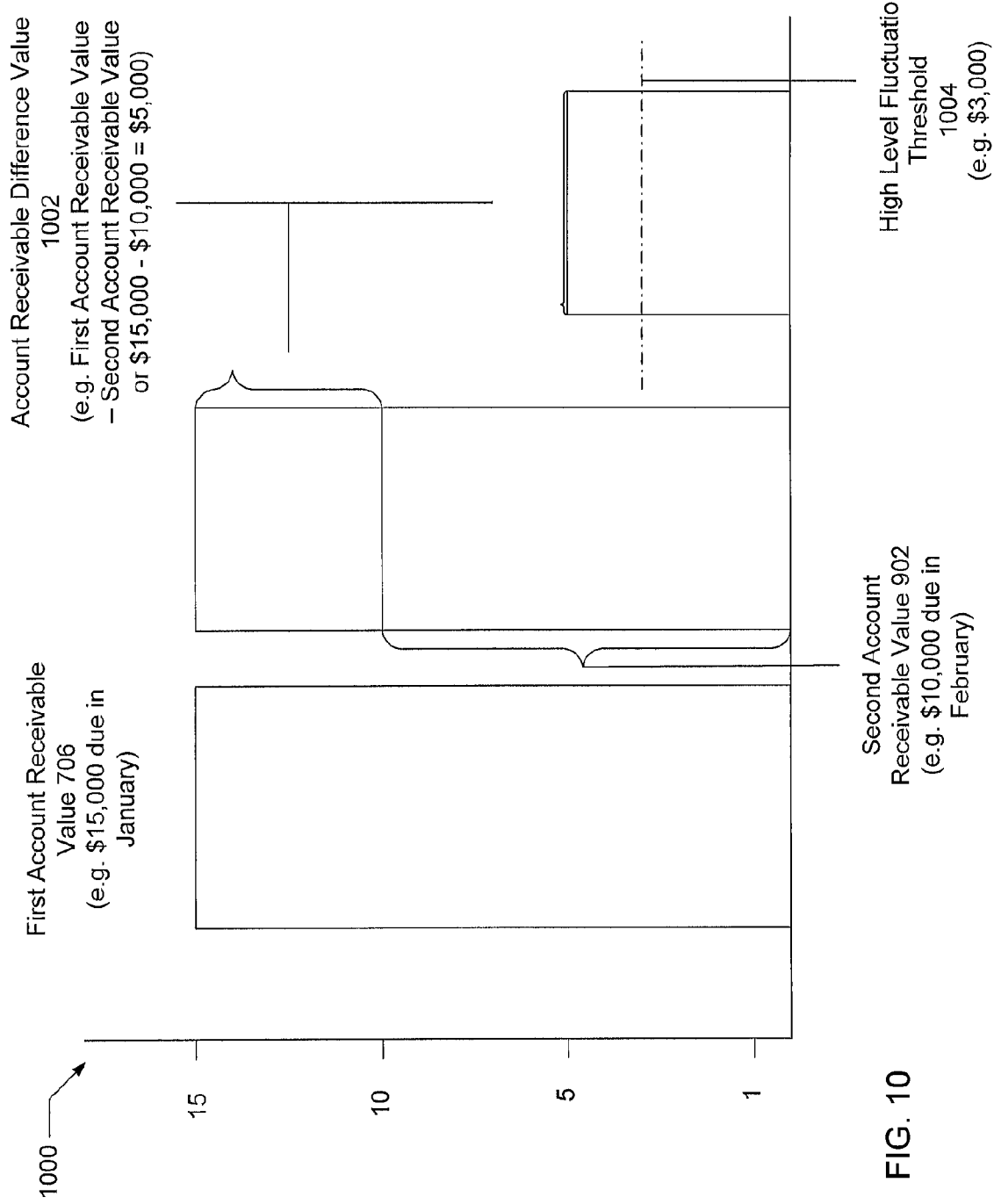
FIG. 10 is a diagram illustrating a high level fluctuation threshold.

A diagram of the relation between the first account receivable value 706, the second account receivable value 902, the account receivable different value 1002, and the high level fluctuation threshold 1004 is presented in FIG. 10. In one embodiment, the high level fluctuation threshold 1004 is defined by the user. For example, the high level fluctuation threshold 1004 is set by the user to $3,000. In the embodiment, the account receivable difference value 1002 is determined by taking the difference between the first account receivable value 706 and the second account receivable value 902. For example, if the first account receivable value 706 is $15,000 and the second account receivable value 902 is $10,000, then the account receivable difference value 1002 is $15,000–$10,000 or $5,000. With the above example, high level fluctuation threshold 1004, the account receivable difference value 1002 would be greater than the account receivable difference value 1002 and an indication would be displayed to the user.

Figure 11:
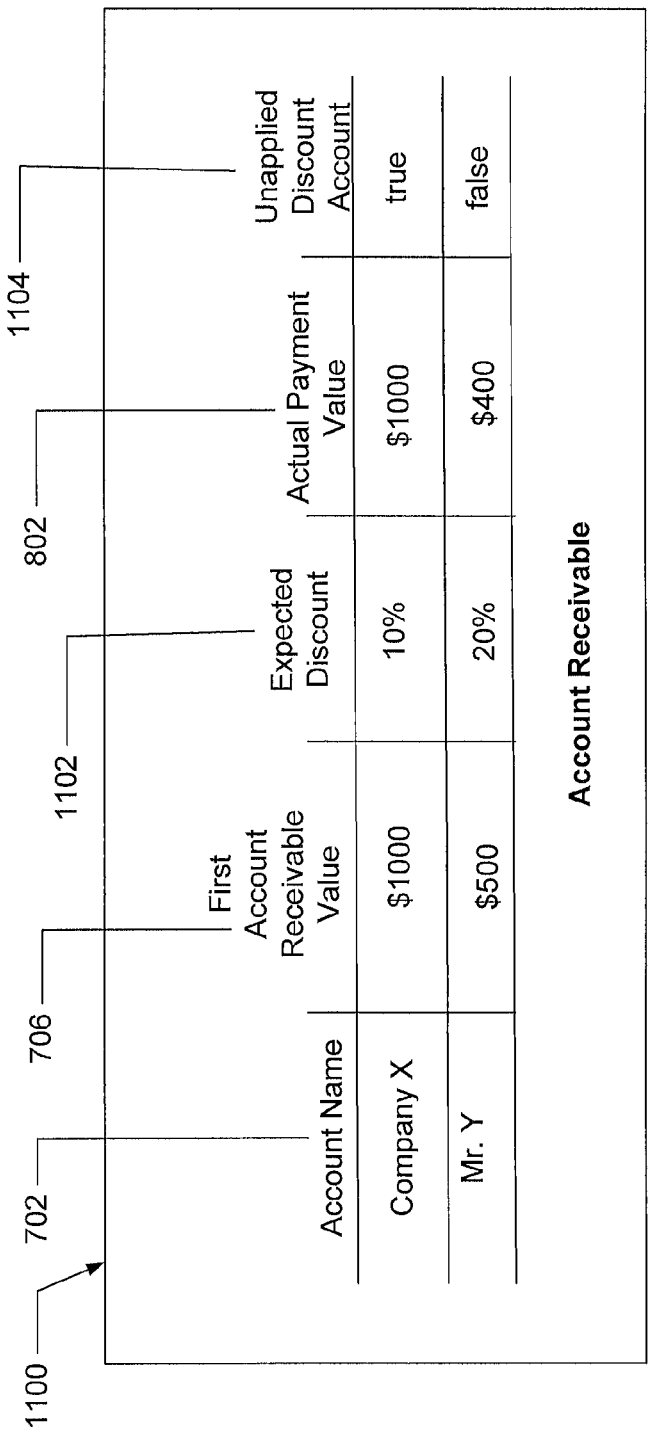
FIG. 11 is a diagram illustrating an unapplied discount account.

A screenshot of an example account receivable entry 1100 is presented in FIG. 11. Although the accounts receivable entry 1100 is described in reference FIG. 11, it will be appreciated that many other configurations are possible. For example, elements could be in different locations, elements could have different names, and elements could have different graphical representations. In one embodiment, the account name 702 is displayed with an associated first account receivable value 706, discount 1102, actual payment value 802, and unapplied discount account indicator 1104. In one embodiment, the system determines whether the discount 1102 has been applied to the account based on the first account receivable value 706 and the actual payment value 802. For example, if the discount value 1102 is 10%, the first account receivable value 706 is $1,000 and the actual payment value 802 is $1,000 then the unapplied discount account indicator 1104 would be true. However, in another example if the first account receivable value 706 is $5,000, discount 1102 is 10% and the actual payment value 802 is $400, then the unapplied discount account indicator 1104 would be false.

Figure 12:
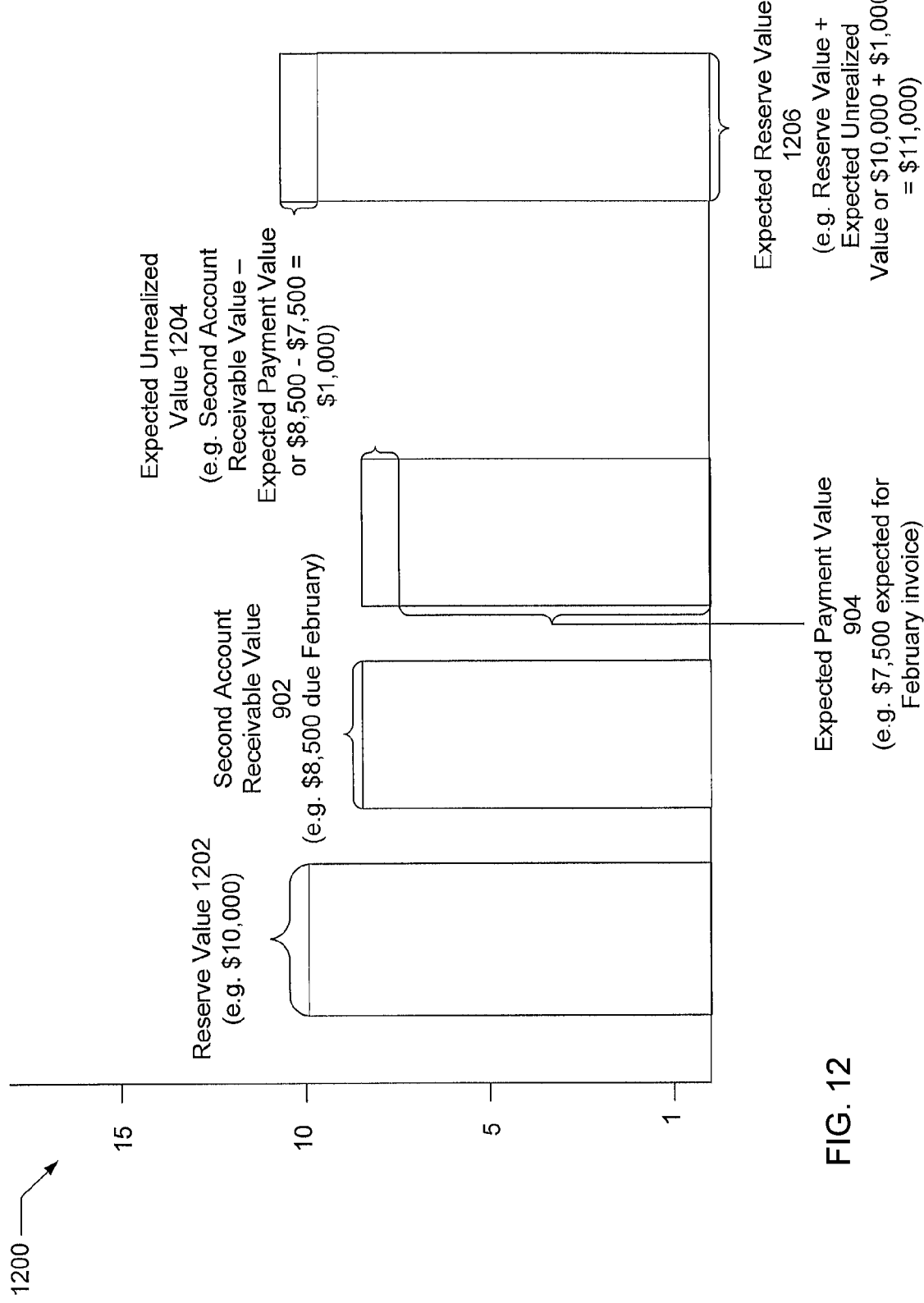
FIG. 12 is a diagram illustrating an expected reserve value.

A diagram of the relationship between the reserve value 1202, second account receivable value 902, net receivable value 904, expected unrealized value 1204, and expected reserve value 1206 is displayed in FIG. 12. In one embodiment, the expected unrealized value 1204 is the difference between the second account receivable value 902 and the net receivable value 904. For example, if the second account receivable value 902 is $8,500 and the net receivable value 904 is $7,500 then the expected unrealized value 1204 is $8,500–$7,500 or $1,000. In one embodiment, the expected reserve value 1206 is the sum of the reserve value 1202 and the expected unrealized value 1204. For example, if the reserve value 1202 is $10,000 and the expected unrealized value 1204 is $1,000 then the expected reserve value 1206 is $10,000+$1,000 or $11,000. In one embodiment, the expected reserve value is displayed and can be used to forecast reserve shortfalls or surpluses. In the embodiment, the reserve value is associated with an amount necessary to compensate for at least one of bad debt write offs, charity care and expected discounts. In one embodiment, the reserve value can come from a plurality of sources. For example, the reserve value 1202 can be received from banks, outside accounting sources, and manual input, et al. In one embodiment, the reserve value 1202 can include a plurality of values. For example, the reserve value can include stocks, bonds, cash, and certificates of deposit, et al.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of tracking a financial status associated with a health care facility, the method comprising:
    receiving with a computer a first account receivable value;
    receiving with the computer an actual payment value associated with the first account receivable value;
    comparing the actual payment value and the first account receivable value using the computer to determine an actual realization amount;
    receiving with the computer a second account receivable value subsequent in time to receiving the first account receivable value;
    calculating with the computer a net receivable value for association with the second account receivable value, the net receivable value calculated using the second account receivable value and the actual realization amount;
    calculating an expected unrealized value with the computer, the expected unrealized value being a difference between the net receivable value and the second account receivable value;
    calculating an expected reserve amount for the health care facility with the computer by summation of a reserve value and the expected unrealized value, wherein the reserve comprises expected charity care and expected discounts, and the expected reserve amount forecasts a reserve shortfall or surplus for financial planning of the health care facility;
    generating a display with the computer that is indicative of the expected reserve amount; and
    communicating the display to an output device via an interface device included in the computer.

2. The method of claim 1, wherein the first account receivable value is a summary value of a plurality of account receivable values.

3. The method of claim 1, further comprising the computer associating in a database a first account type with the first account receivable value, and a second account type with the second account receivable value.

4. The method of claim 3, further comprising:
    changing in the database the first account type to a third account type with the computer;
    wherein the display indicative of the expected reserve amount includes an indication of the third account type.

5. The method of claim 1, further comprising:
    retrieving with the computer from a database a high level fluctuation threshold, the high level fluctuation threshold being indicative of a threshold value for a difference between the first account receivable value and the actual payment value;
    comparing with the computer the first account receivable value with the actual payment value to generate with the computer an account receivable difference value; and
    determining a high level fluctuation account with the computer by comparing the account receivable difference value with the high level fluctuation threshold;
    wherein the display indicative of the expected reserve amount includes an indication of the high level fluctuation account and the account receivable difference value.

6. The method of claim 1, including:
    determining an account discount value with the computer, the account discount value being an amount less than the first account receivable value that the actual payment value should be; and
    comparing the account discount value with the first account receivable value and the actual payment value to determine with the computer an unapplied discount account;
    wherein the display indicative of the expected reserve amount includes an indication of the unapplied discount account.

7. The method of claim 1, wherein the first account value and the actual payment value are category metric values of the health care facility.

8. The method of claim 1, wherein calculating the net receivable value with the computer includes the computer multiplying the actual realization amount with the second account receivable value.

9. The method of claim 1, including:
    determining an unrealized value with the computer, the unrealized value being a difference between the first account receivable value and the actual payment value for a financial transaction;
    determining an unrealized category with the computer, the unrealized category being associated with the expected unrealized value;
    wherein the display indicative of the expected reserve amount includes an indication of the unrealized category and the associated expected unrealized value.

10. The method of claim 1, wherein the reserve value is associated by the computer with the expected unrealized value in a database.

11. The method of claim 1, wherein the reserve value further comprises bad debt write offs.

12. The method of claim 1, wherein calculating the net receivable value includes calculating the net receivable value with the computer using data from a plurality of health care facilities.

13. The method of claim 12, wherein the display indicative of the expected reserve value includes the net receivable value and a summary of gross accounts receivable by the health care facilities.

14. A non-transitory computer readable storage medium configured to store instructions executable by a computing device, the non-transitory computer readable storage medium comprising:
    instructions executable by the computing device to receive a first account receivable value of a health care facility;
    instructions executable by the computing device to receive an actual payment value associated with the first account receivable value;

instructions executable by the computing device to compare the actual payment value and the first account receivable value to determine an actual realization amount for the health care facility;

instructions executable by the computing device to receive a second account receivable value of the health care facility subsequent in time to receiving the first account receivable value;

instructions executable by the computing device to calculate a net receivable value associated with the second account receivable value based on the second account receivable value and the actual realization amount; and instructions executable by the computing device to calculate an expected unrealized value as a difference between the net receivable value and the second account receivable value;

instructions executable by the computing device to calculate an expected reserve amount using a reserve value of the health care facility, and the expected unrealized value, wherein the reserve value comprises expected charity care and expected discounts, and the expected reserve amount is a forecast of a reserve shortfall or surplus for financial planning of the health care facility;

instructions executable by the computing device to generate a display indicative of the expected reserve amount; and instructions executable by the computing device to communicate the display to an output device via an interface device included in the computing device.

15. The non-transitory computer readable storage medium of claim 14, wherein the first account receivable value is associated with a first time duration and the second account receivable value is associated with a second time duration, the second account receivable time duration being different than the first account receivable time duration.

16. The non-transitory computer readable storage medium of claim 14, further comprising:
instructions executable by the computing device to determine a high level fluctuation threshold, the high level fluctuation threshold being indicative of a threshold value for a difference between the first account receivable value and the second account receivable value;
instructions executable by the computing device to compare the first account receivable value with the second account receivable value to determine an account receivable difference value; and
instructions executable by the computing device to determine a high level fluctuation account by comparison of the account receivable difference value with the high level fluctuation threshold, wherein the display indicative of the expected
reserve amount includes an indication of the high level fluctuation account and the account receivable difference value.

17. The non-transitory computer readable storage medium of claim 14, further comprising instructions executable by the computing device to cause the computing device to determine a reserve amount, the reserve amount being an amount of funds unavailable to the health care facility.

18. The non-transitory computer readable storage medium of claim 14, further comprising:
instructions executable by the computing device to determine an unrealized amount, the unrealized amount being a difference between the first account receivable value and the actual payment value; and
instructions executable by the computing device to determine an unrealized category, the unrealized category being associated with the unrealized amount, wherein the display indicative of the expected reserve amount includes an indication of the unrealized category and the associated unrealized amount.

19. A non-transitory computer readable storage medium configured to store instructions executable by a processor, the non-transitory computer readable storage medium comprising:
instructions in an accounting calculation module that are executable by the processor to calculate a first account receivable value based on financial data of a financial account of a health care facility;
instructions in the accounting calculation module that are executable by the processor to calculate a second account receivable value based on the financial data;
instructions in the accounting calculation module that are executable by the processor to calculate an actual realization rate by division using as one of a numerator and a denominator, an actual payment value and the first account receivable value, the actual payment value from payment information associated with the first account receivable value;
instructions in the accounting calculation module that are executable by the processor to calculate an expected net receivable value by multiplication of the actual realization rate and the second account receivable value;
instructions in the accounting calculation module that are executable by the processor to calculate an expected unrealized value representative of a difference between the expected net receivable value and the second account receivable value; and
instructions in the accounting calculation module that are executable by the processor to calculate an expected reserve amount for the health care facility by summation of a reserve value of the health care facility and the expected unrealized value, wherein the reserve value comprises expected charity care and expected discounts, and the expected reserve amount is indicative of a future forecast of a reserve shortfall or a reserve surplus for financial planning of the financial account of the health care facility.

20. The non-transitory computer readable storage medium of claim 19, further comprising instructions in a display module that are executable by the processor to generate a display that is indicative of the expected reserve amount, the display provided via an interface circuit for display as a web page on a terminal.

* * * * *